March 24, 1942.   H. J. DE N. McCOLLUM   2,277,598
AUTOMOBILE HEATER CONTROL SYSTEM
Filed June 24, 1939
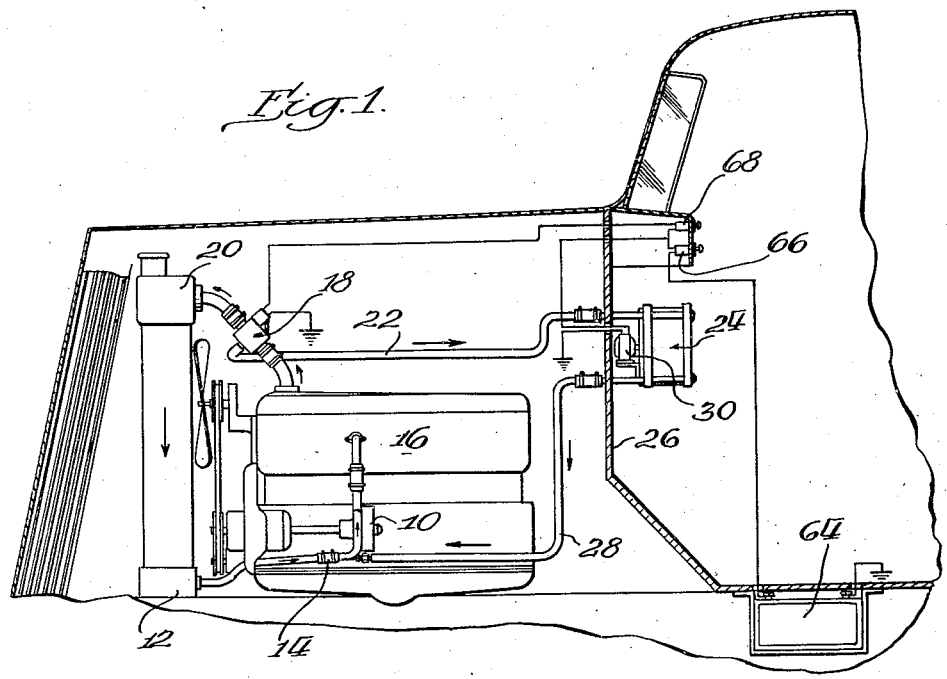
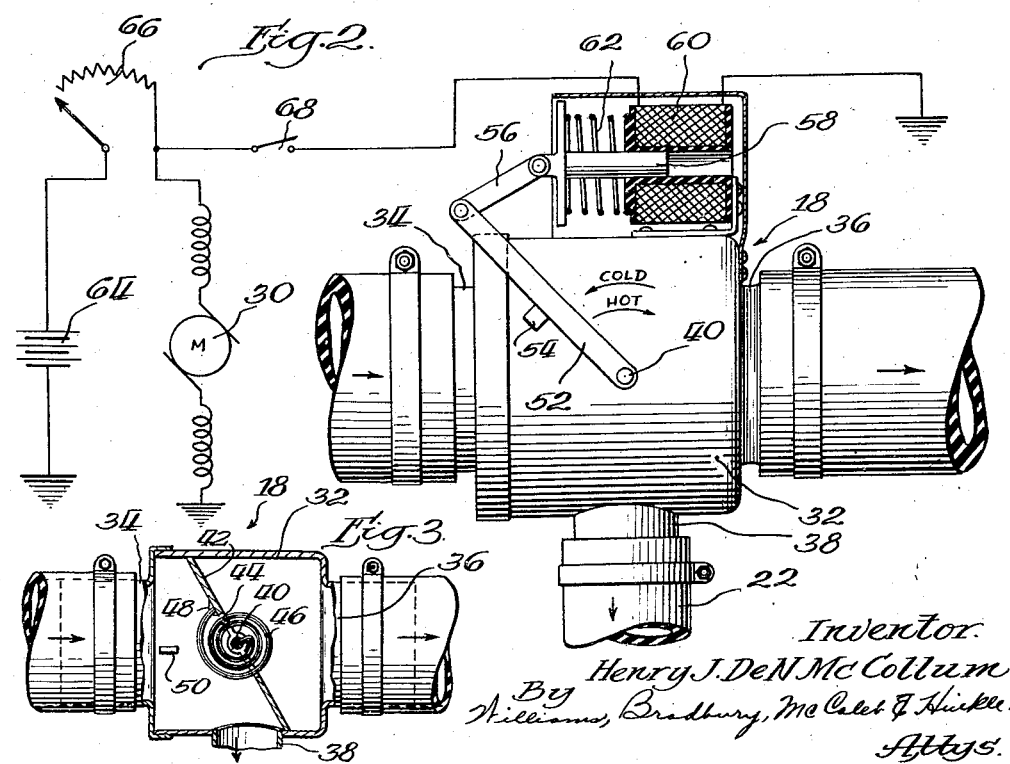
Inventor.
Henry J. DeN McCollum Patented Mar. 24, 1942

2,277,598

UNITED STATES PATENT OFFICE 2,277,598

AUTOMOBILE HEATER CONTROL SYSTEM

Henry J. De N. McCollum, Chicago, Ill.

Application June 24, 1939, Serial No. 281,012

6 Claims. (Cl. 237—2)

This invention relates to automobile heaters and provides a control system for compartment heaters of the type having a heat exchanger over which an electric fan blows air to be warmed and through which hot water from the engine cooling system is circulated. One objection to hot water heaters of this type is that under some weather conditions, they do not raise the temperature of the air passed over the heat exchanger sufficiently to maintain the compartment temperature at a comfortable level. Also considerable time is often required to bring the compartment to a comfortable temperature even under conditions where the heater has sufficient capacity to maintain the compartment sufficiently warm once this temperature has been established.

Another serious objection is that at high motor speeds, the thermostatic valves usually provided in automobile cooling systems are forced open by the increased water pressure, even though the water may be quite cool. This is a frequent cause of loss of heater efficiency at high speeds.

It is an object of my invention to provide novel heater control means to overcome the above objections.

Another object of the present invention is to provide a novel heater control system which is adapted to increase the heating capacity of a hot water automobile heater when such additional capacity is desired.

Still another object is to provide novel control mechanism for increasing the temperature and quantity of the water supplied by an internal combustion engine cooling system to an automobile hot water heater.

Other objects and advantages of the present invention will become apparent from the following description and drawing in which:

Fig. 1 is a somewhat diagrammatic view showing a control embodying the present invention as installed in an automobile;

Fig. 2 is a side elevation of a control valve embodying the present invention shown together with a circuit diagram for operating the valve and the heater with which it is used; and Fig. 3 is a vertical sectional view of the valve illustrated in Fig. 2.

In the drawing, similar characters of reference denote similar elements throughout the several views.

Referring to Fig. 1 of the drawing, an automobile water pump 10 draws water from the bottom of a radiator 12 through a hose connection 14 and forces this water into a motor block 16. Within the motor block the water is heated and passed upwardly through a thermostatic control valve 18 into a radiator tank 20. From the tank, the water flows downwardly through the heat exchanger portion of the radiator 12 to complete the motor cooling cycle.

From the valve 18, a portion of the hot water is diverted through a pipe or hose 22 to the top of the car heater radiator 24 which is mounted upon the dash 26. The hot water passes downwardly through the radiator and returns through a pipe or hose 28 to the intake side of the pump 10.

Thus, when the automobile engine is in operation, water is continuously circulated through the pump, motor block and radiator and through the pump, motor block and car heater radiator.

An electric fan 30 is adapted to blow air through the heater radiator 24 to warm the automobile compartment.

The thermostatically controlled valve 18 comprises a cylindrical shell 32 having an inlet hose connection 34 at one end and an outlet hose connection 36 at the other. In Figs. 2 and 3, which best illustrate the details of the thermostatic valve 18, the inlet is shown to the left and the outlet at the right. A hose nipple 38 communicates with the interior of the shell 32 at a position approximately equidistant from the inlet and outlet fittings. This nipple 38 provides the branch connection to the car heater supply hose 22 previously mentioned.

A shaft 40 extends diametrically through the shell 32 normal to the axis of the nipple 38 and carries a freely movable butterfly valve plate 42 thereon. The central portion of the valve plate 42 is provided with a substantially rectangular opening 44 within which a coiled bimetal thermostatic element 46 is positioned with its inner end rigidly secured to the shaft 40. The outward end of the bimetal element is connected at 48 to the valve plate 42, so that a sufficient increase in temperature of the bimetal element will cause the valve plate to be rotated into a position parallel with the axis of the cylindrical shell 32. In this position, the resistance to the flow of water through the shell from left to right is at a minimum. A stop member 50 secured to the interior of the shell is engaged by the valve plate when the valve is completely opened to prevent additional heating of the bimetal element from tilting the valve plate beyond a position parallel to the axis of the shell.

Upon cooling, the bimetal element swings the valve plate into closed position, as shown in Fig. 3, and the circulation of water from the inlet opening 34 to the outlet opening 36 is restricted to the amount that can flow around the bimetal element 46 and through the opening 44.

One end of the shaft 40 which projects through the shell 32 is secured to an arm 52 projecting normal thereto in an upwardly direction. This arm rests against a stop 54 and holds the bimetal element in such a position that the butterfly valve is closed when the water in the cooling system is cold.

The outward end of the arm 52 is connected by a link 56 to an armature 58. When energized, a solenoid 60 mounted upon the shell 32 is adapted to attract this armature and swing the lever 52 in a clockwise direction. A light coil spring 62 biases the armature 58 outwardly and holds the lever 52 against the stop 54 whenever the solenoid is deenergized.

Referring to the electrical circuit, one side of an automobile battery 64 is grounded while the other side is connected to one terminal of a combination switch and variable resistor 66. The other terminal of the resistor 66 is connected to a line having two branches, one of which is grounded through the fan 30, while the other extends to ground through a normally closed single pole single throw switch 68 and the solenoid 60 in series. In most installations, the switch 68 may be omitted and the winding 60 of the solenoid may be connected in parallel with the fan motor 30.

It will be understood that automobile thermostats are normally constructed so that they will open to permit free flow of the cooling water therethrough at a temperature lower than that desirable in the heater. The efficiency of operation of the engine is not, however, materially affected if the temperature of the water in the cooling system is raised 15° or 20° F. above that for which the thermostat is normally adjusted. Frequently the thermostats are adjusted to open at a temperature considerably lower than that considered the optimum for engine operation, due to the fact that alcohol, or other substance having a relatively low boiling point, is used as an anti-freeze agent.

In normal operation of the automobile when the heater is not in use, the thermostat will operate in the normal manner. When, however, the switch and motor control rheostat 66 is operated to energize the fan motor, the solenoid 60 will be simultaneously energized, and additional tension placed upon the bimetal thermostatic element 46 so as to cause the latter to retain the valve 42 in the closed position in which it is shown in Fig. 3 until the temperature is 10- or 20° higher than that at which the valve would normally open. As a result, substantially all of the water circulated through the water jacket of the engine by the pump 10 will flow through the heater 24 until the water reaches a temperature 10° or 20° higher than that for which the thermostatic valve is normally adjusted. Thus, during the initial period of operation of the engine and heater, practically all of the heat dissipated into the cooling water system is made available for heating the passenger compartment of the vehicle, and in extremely cold weather, under conditions in which the engine is running under light load, the temperature of the cooling water may never rise above the temperature required to open the valve 42.

In certain installations, it may be desirable to provide the switch 68 so that the solenoid 60 may be disconnected from the system, as for example when an anti-freeze agent having a very low boiling point is temporarily used in the cooling system. In ordinary installations, however, the switch 68 may, as previously stated, be omitted.

While I have shown and described a particular form of my invention, it will be apparent to those skilled in the art that numerous variations and modifications of my invention may be made without departing from the underlying principles thereof. For example, in a modified form of my invention, the adjustment of the position of the valve stem 40 may be accomplished through a mechanical linkage or a Bowden wire connected directly to the manual control button of the heater so as to be swung clockwise (Fig. 2) whenever the heater is turned on. I therefore desire, by the following claims, to include within the scope of my invention all such modified forms of my invention whereby substantially the results thereof may be obtained, using substantially the same or equivalent means.

I claim:

1. An automobile heater control system comprising a heater radiator, an electric motor driven fan to circulate air through said radiator, a thermo-responsive valve through which water is supplied to said radiator, electromagnetic means to alter the temperature responsive characteristics of said valve, a source of electric current supply, manually responsive means to energize said fan motor from said source, and a separate manually responsive means to energize said electromagnetic means from said source, said separate manually responsive means being inoperative to energize said electromagnetic means when said fan is de-energized.

2. In an automobile hot water heater system having an automobile engine, a radiator therefor, a hot water heater, conduits to circulate water from the engine through the radiator, a temperature responsive valve in a portion of the conduit between the engine and the radiator, a hose leading from the engine side of said conduit portion to said heater, said valve being adapted to open when the water therein rises above a predetermined temperature, electro-magnetic means operable in conjunction with the operation of said heater for altering the temperature responsive characteristics of said valve to prevent opening of said valve until the temperature of the water therein exceeds the predetermined temperature, and manually operable means for actuating said heater and simultaneously energizing the electromagnetic means.

3. In a heating system for automobiles having a passenger compartment, a water cooled internal combustion engine, a radiator, a conduit connecting the engine to the radiator to convey water heated by the engine to the radiator, and a hot water heater in the passenger compartment having a hose connected to the first conduit and a hose connected to return water to the cooling system of the engine; the combination comprising a temperature responsive valve in said conduit, a member movable between first and second positions of adjustment to determine the temperature at which said valve opens, said member when in the first position of adjustment permitting opening of said valve at normal engine operating temperature and when in the second position of adjustment preventing opening of the valve until a temperature higher than normal engine temperature is reached, a manually operated element associated with said heater to render the latter operative or inoperative, and actuating means connected between said movable member and said element and operated incidental to operation of said element in a manner to render said heater operative and to move said member to its second position of adjustment.

4. The combination set forth in claim 3 in which said means comprises an electromagnet and energizing circuit therefor which is completed upon operation of said element in a manner to render said heater operative.

5. The combination set forth in claim 3 in which said temperature responsive valve includes a thermostat having an operative connection with said valve and is mounted upon a movable support, and in which said means includes an electromagnet for moving said support in a direction to cause said thermostat to open said valve at a higher than normal temperature.

6. In an automobile hot water heater system having an automobile engine, a radiator therefor, a hot water heater, conduits to circulate water from the engine through the radiator, a temperature responsive valve in a portion of the conduit between the engine and the radiator, a hose leading from the engine side of said conduit portion to said heater, said valve being adapted to open when the water therein rises above a predetermined temperature, means operable in conjunction with the operation of said heater for altering the temperature responsive characteristics of said valve to prevent opening of said valve until the temperature of the water therein exceeds the predetermined temperature, and manually operable means for simultaneously actuating said heater and said means.

HENRY J. De N. McCOLLUM.